US010436256B2

(12) United States Patent
Kawamura et al.

(10) Patent No.: US 10,436,256 B2
(45) Date of Patent: Oct. 8, 2019

(54) DRIVE TRANSMISSION DEVICE

(71) Applicant: CANON KABUSHIKI KAISHA, Tokyo (JP)

(72) Inventors: Koji Kawamura, Yokohama (JP); Junichi Ochi, Mishima (JP); Joji Goto, Susono (JP)

(73) Assignee: Canon Kabushiki Kaisha, Tokyo (JP)

( * ) Notice: Subject to any disclaimer, the term of this patent is extended or adjusted under 35 U.S.C. 154(b) by 68 days.

(21) Appl. No.: 15/431,844

(22) Filed: Feb. 14, 2017

(65) Prior Publication Data

US 2017/0248171 A1    Aug. 31, 2017

(30) Foreign Application Priority Data

Feb. 26, 2016    (JP) ................. 2016-036060

(51) Int. Cl.
| | |
|---|---|
| *F16D 11/14* | (2006.01) |
| *F16D 23/12* | (2006.01) |
| *G03G 15/00* | (2006.01) |
| *G03G 21/16* | (2006.01) |
| *F16D 3/10* | (2006.01) |
| *G03G 21/18* | (2006.01) |

(52) U.S. Cl.
CPC ............. *F16D 11/14* (2013.01); *F16D 23/12* (2013.01); *G03G 15/757* (2013.01); *G03G 21/1647* (2013.01); *F16D 3/10* (2013.01); *F16D 2023/123* (2013.01); *F16D 2300/22* (2013.01); *G03G 21/186* (2013.01); *G03G 2221/1657* (2013.01)

(58) Field of Classification Search
CPC ....................................................... F16D 11/14
See application file for complete search history.

(56) References Cited

U.S. PATENT DOCUMENTS

| | | | | |
|---|---|---|---|---|
| 4,437,552 A | * | 3/1984 | Toyama | ............... F16D 13/025 |
| | | | | 192/12 BA |
| 4,458,796 A | * | 7/1984 | Nitanda | ................... B65H 5/06 |
| | | | | 192/48.9 |
| 5,633,699 A | | 5/1997 | Aruga et al. | |
| 6,795,671 B2 | | 9/2004 | Matsuoka | |
| 7,826,773 B2 | * | 11/2010 | Kawamura | ........ G03G 15/0121 |
| | | | | 399/228 |

(Continued)

FOREIGN PATENT DOCUMENTS

| | | | |
|---|---|---|---|
| JP | 02195025 A | * | 8/1990 |
| JP | H07-257776 A | | 10/1995 |

(Continued)

*Primary Examiner* — David R Morris
(74) *Attorney, Agent, or Firm* — Venable LLP

(57) ABSTRACT

A drive transmission device includes: a first rotating member that rotates with driving power received from a driving source, a second rotating member that rotates with driving power from the first rotating member, and a driving-side engagement member and a driven-side engagement member for transmitting the driving power of the first rotating member to the second rotating member, wherein the driving-side engagement member and the driven-side engagement member engage with each other in a state in which the first rotating member is rotating whereby a power applying portion and a power receiving portion engage with each other while resisting against a second biasing power.

16 Claims, 14 Drawing Sheets

(56) References Cited

U.S. PATENT DOCUMENTS

| | | | |
|---|---|---|---|
| 8,116,664 B2 * | 2/2012 | Kawamura | G03G 15/0121 399/223 |
| 8,238,795 B2 * | 8/2012 | Kawamura | G03G 15/0121 399/228 |
| 8,655,230 B2 * | 2/2014 | Kawamura | G03G 15/0121 399/228 |
| 8,794,413 B2 * | 8/2014 | Ishikawa | F16D 11/04 192/69.9 |
| 9,244,385 B2 * | 1/2016 | Kawamura | G03G 15/0121 |
| 9,291,993 B2 * | 3/2016 | Sawashima | G03G 21/186 |
| 9,857,749 B2 * | 1/2018 | Ochi | B65H 85/00 |
| 2003/0138270 A1 * | 7/2003 | Matsuoka | G03G 15/0194 399/228 |
| 2007/0177899 A1 * | 8/2007 | Kawamura | G03G 15/0121 399/223 |
| 2011/0026972 A1 * | 2/2011 | Kawamura | G03G 15/0121 399/223 |
| 2012/0114376 A1 * | 5/2012 | Kawamura | G03G 15/0121 399/112 |
| 2012/0275822 A1 * | 11/2012 | Kawamura | G03G 15/0121 399/111 |
| 2014/0008171 A1 * | 1/2014 | Ishikawa | F16D 11/10 192/69.9 |
| 2014/0119774 A1 * | 5/2014 | Kawamura | G03G 15/0121 399/119 |
| 2015/0160608 A1 * | 6/2015 | Sawashima | G03G 21/186 399/167 |
| 2015/0301492 A1 | 10/2015 | Ochi | |

FOREIGN PATENT DOCUMENTS

| | | | |
|---|---|---|---|
| JP | 2001-209221 A | | 8/2001 |
| JP | 2003-208024 A | | 7/2003 |
| JP | 2003208024 A | * | 7/2003 |
| JP | 2007-239964 A | | 9/2007 |
| KR | 100756043 B1 | * | 9/2007 ........ G03G 15/168 |

* cited by examiner

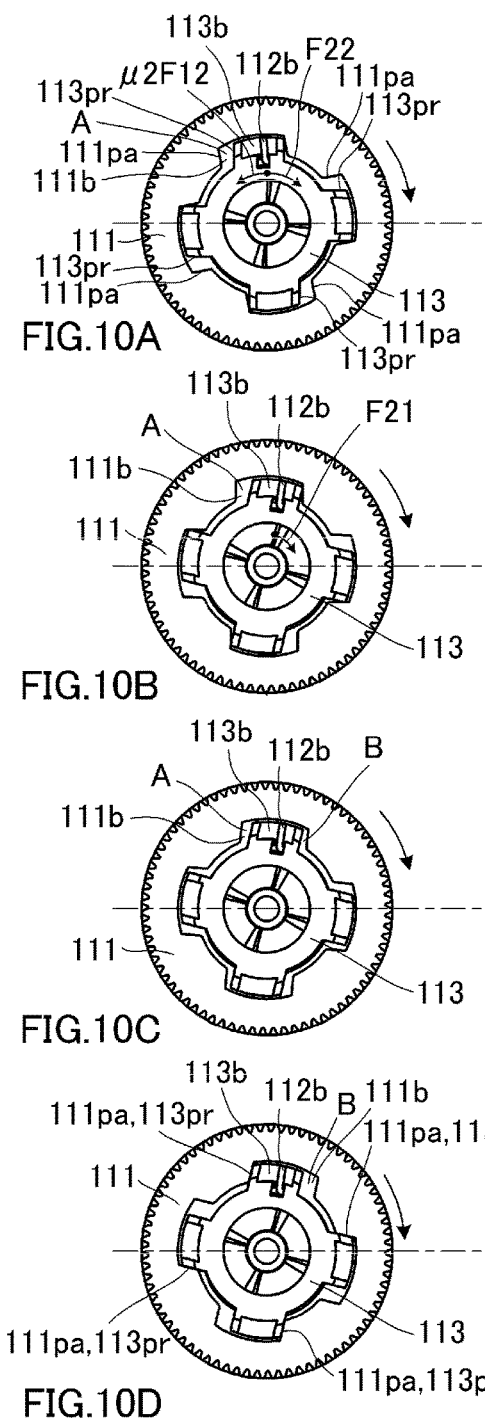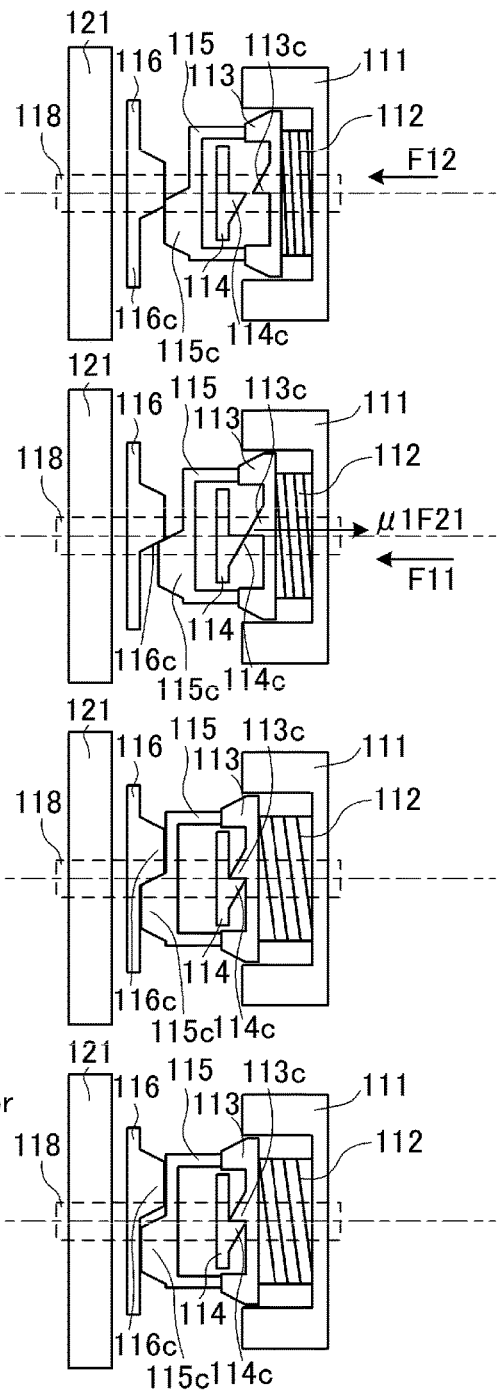
FIG.10A
FIG.10B
FIG.10C
FIG.10D

DRIVE TRANSMISSION DEVICE

BACKGROUND OF THE INVENTION

Field of the Invention

The present invention relates to a drive transmission device provided in an image forming apparatus such as a copier or a printer.

Description of the Related Art

Conventionally, in an in-line-type color image forming apparatus which uses an electrophotographic system, for example, a method of controlling respective rotation of an electrophotographic photosensitive member (a photosensitive member) and a developing apparatus separately to suppress the rotation of the developing apparatus as much as possible has been considered in order to obviate problems relating to consumption or deterioration of developer. Moreover, a method in which a photosensitive member and a developing apparatus are driven by one motor and a clutch is provided in a driving system of the developing apparatus to control rotation or a state of stoppage has been considered in order to reduce the cost and the size of an image forming apparatus. A driving system of a developing apparatus of a conventional image forming apparatus often uses an electromagnetic clutch or a spring clutch. However, this configuration has problems in that the cost is relatively high, the shape is limited, malfunction due to slip may occur, etc.

In this respect, Japanese Patent Application Publication No. 2003-208024 discloses a mechanical clutch which is provided in a driving system of a developing apparatus. As illustrated in FIG. 11, this mechanical clutch is configured so that a release member 155 having a cam surface 155c that engages with a cam surface 156c of a clutch lever 156 moves in an axial direction in accordance with the rotation of the clutch lever 156. With movement of the release member 155, a driving-side engagement member 153 is moved in the axial direction, whereby driving is connected and disconnected between a driving-side engagement member 153 and a driven-side engagement member 154. The driving-side engagement member 153 is biased in the axial direction by a coil spring 152 toward a position where engagement with the driven-side engagement member 154 is made possible. When the release member 155 is moved in the axial direction by rotation of the clutch lever 156, the driving-side engagement member 153 moves in the axial direction by the power of the coil spring 152 so as to be connected to the driven-side engagement member 154.

In this mechanical clutch, when realizing the connection, in order to allow the driving-side engagement member 153 and the driven-side engagement member 154 to reliably engage with each other, it is necessary to move the driving-side engagement member 153 toward the driven-side engagement member 154 as quickly as possible. For this purpose, the gradient of the cam surface needs to be set in a manner such as to make inclination surfaces of the cam surfaces 155c and 156c as steep as possible, which means to achieve an increase in the moving amount of the driving-side engagement member 153 in the axial direction in relation to a rotation amount of the clutch lever 156.

However, this mechanical clutch has the following problems to be alleviated. In the mechanical clutch, a state in which the apexes of the cams of the release member and the clutch lever are in contact with each other in the axial direction, which is the moving direction of the release member, is a state in which the connection of driving is released. When the clutch lever is rotated from this state to realize a connection state of driving, the release member moves in the axial direction along the cam surface by the biasing power of the coil spring.

Due to this, when the cam surface is provided at a steep angle to reliably connect the clutch, collision between the release member and the clutch lever occurs and outbreak noise is generated. In recent years, since noise-reduction of an image forming apparatus has progressed, the outbreak noise generated from the mechanical clutch has become increasingly noticeable.

SUMMARY OF THE INVENTION

An object of the present invention is to provide a technique of suppressing outbreak noise generated in a drive transmission device having a mechanical clutch.

The present invention provides a drive transmission device including: a first rotating member that rotates with driving power received from a driving source; a second rotating member that rotates with driving power from the first rotating member; a driving-side engagement member for transmitting the driving power of the first rotating member to the second rotating member, the driving-side engagement member being provided with a power receiving portion for receiving the driving power of the first rotating member, the power receiving portion engaging with a power applying portion formed in the first rotating member; a driven-side engagement member for transmitting the driving power of the first rotating member to the second rotating member; and a biasing member that biases at least one of the driving-side engagement member and the driven-side engagement member with a first biasing power in a direction which corresponds to a central line of rotation of the first rotating member and in which the driving-side engagement member and the driven-side engagement member engage with each other, wherein the driving-side engagement member and the driven-side engagement member engage with each other in a state in which the first rotating member is rotating, such that the driving power is transmitted from the first rotating member to the second rotating member via the power applying portion and the power receiving portion, wherein a gap is formed between the power applying portion and the power receiving portion in relation to a rotating direction of the first rotating member, wherein the driving-side engagement member is biased with a second biasing power which is the biasing power in the rotating direction of the first rotating member, wherein the power applying portion and the power receiving portion are separated by the second biasing power when the driving-side engagement member and the driven-side engagement member are not in engagement, and wherein the driving-side engagement member and the driven-side engagement member engage with each other in a state in which the first rotating member is rotating, such that the power applying portion and the power receiving portion engage with each other while resisting against the second biasing power.

Further features of the present invention will become apparent from the following description of exemplary embodiments (with reference to the attached drawings).

BRIEF DESCRIPTION OF THE DRAWINGS

FIGS. 10A to 10D are cross-sectional views of the drive transmission device according to the first embodiment;

DESCRIPTION OF THE EMBODIMENTS

Hereinafter, the present invention will be described in detail based on embodiments. However, dimensions, materials, shapes, relative positions, and the like of constituent components described in the embodiment are changed appropriately according to a configuration and various conditions of an apparatus to which the present invention is applied. That is, the scope of the present invention is not limited to the following embodiments.

First Embodiment (Electrophotographic Image Forming Apparatus)

Figure 1:
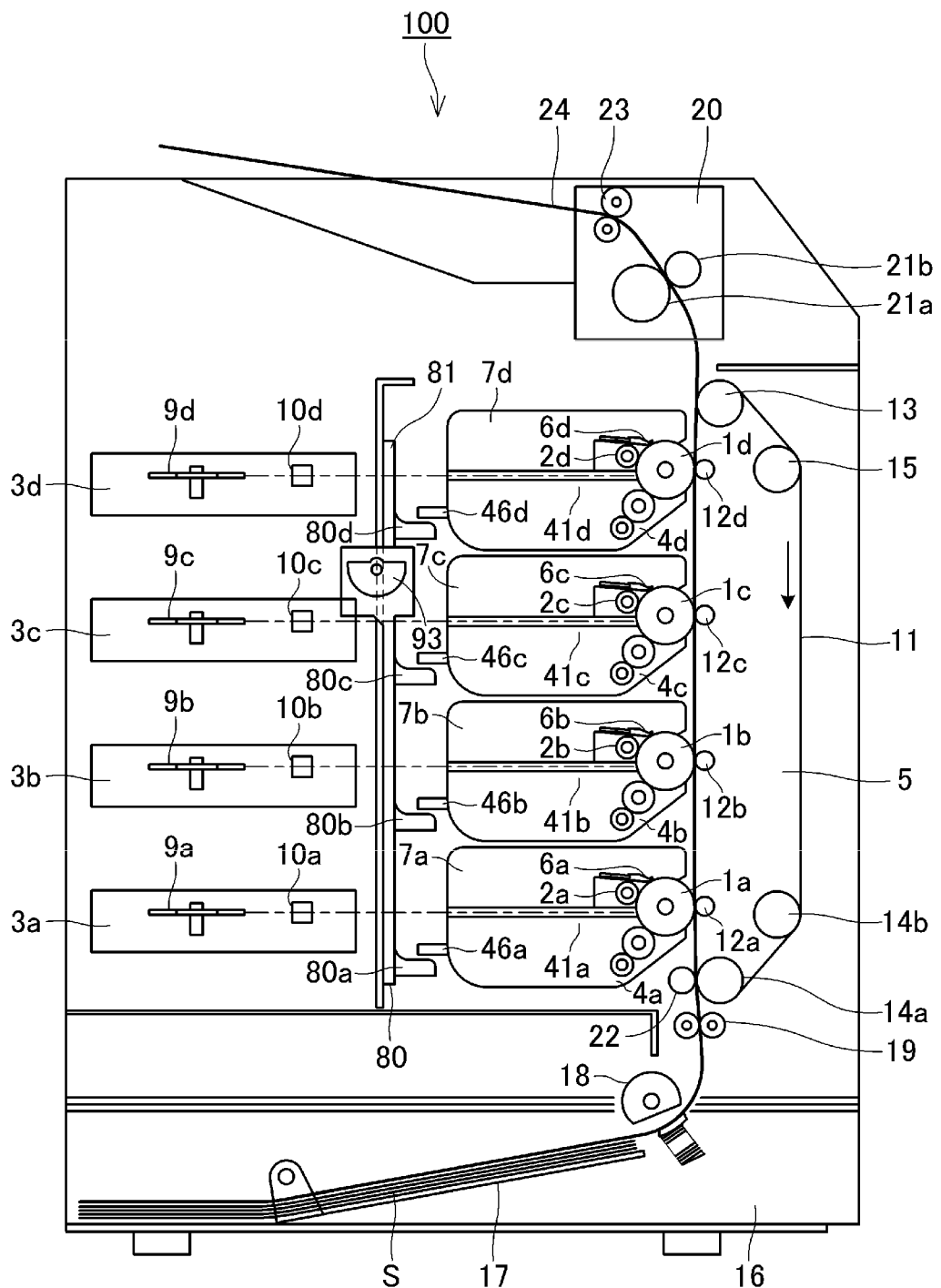
FIG. 1 is a cross-sectional view of an image forming apparatus according to a first embodiment.
Figure 2:
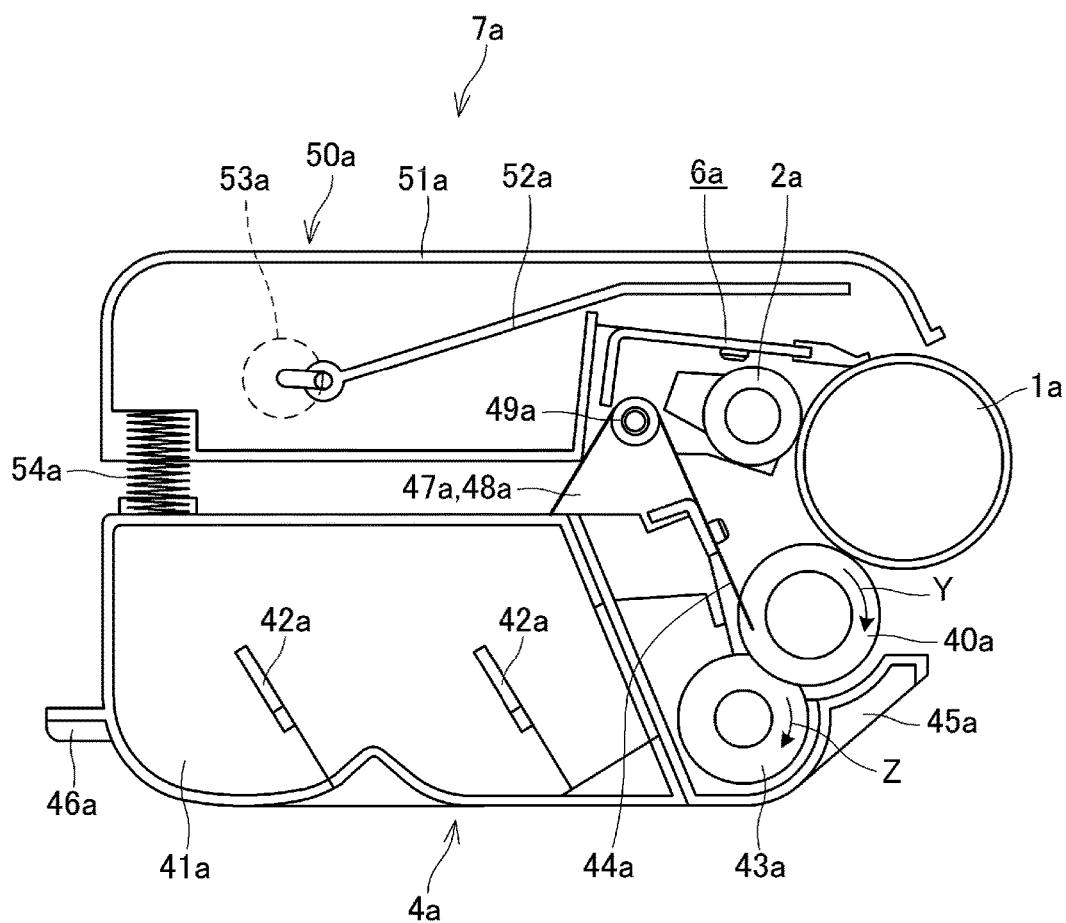
FIG. 2 is a cross-sectional view of a process cartridge of the first embodiment.
Figure 3:
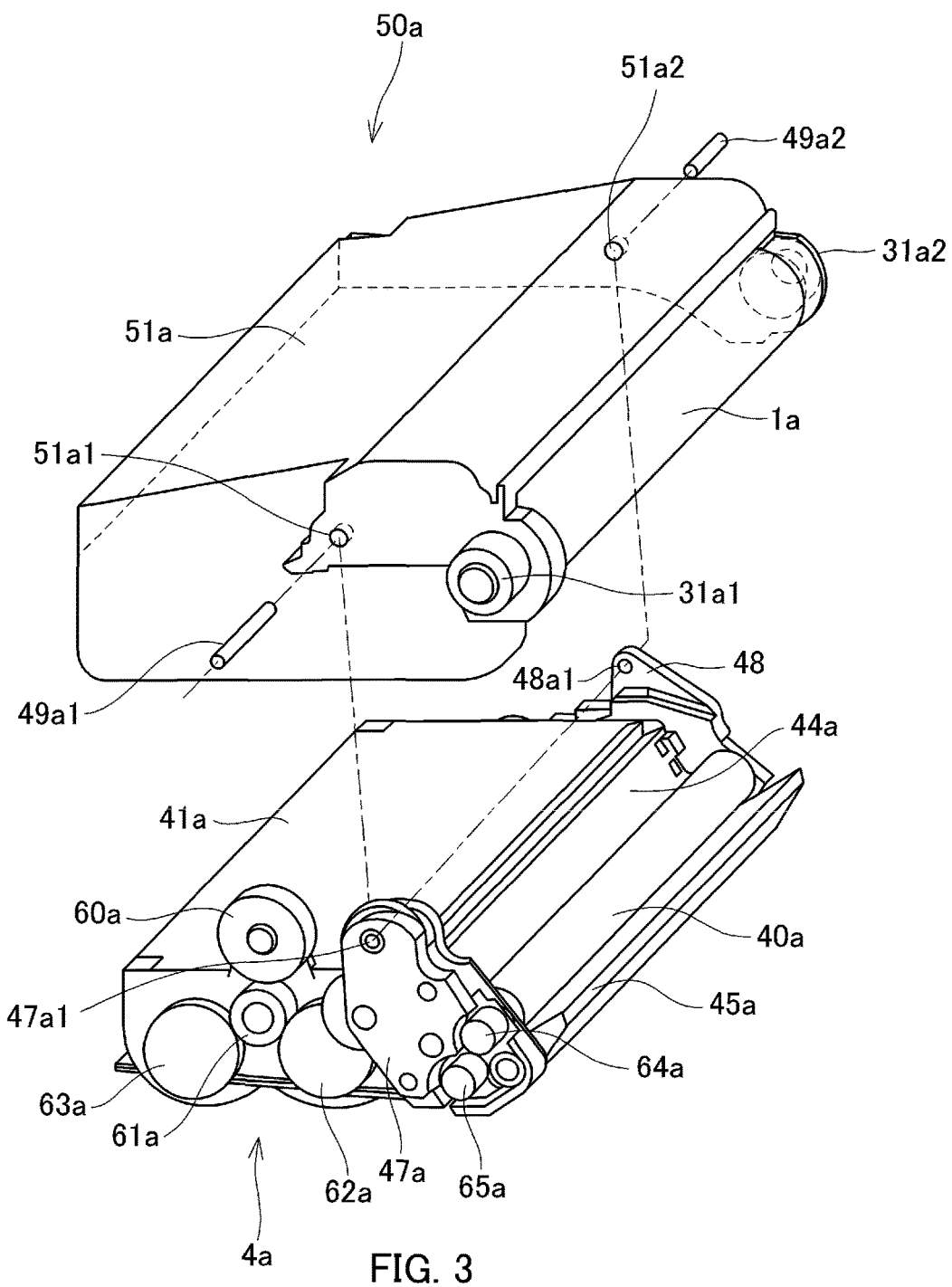
FIG. 3 is an exploded perspective view of the process cartridge of the first embodiment.

Description will be given with reference to FIGS. 1, 2, and 3. FIG. 1 is a schematic cross-sectional view illustrating an entire structure of a full-color laser beam printer which is a specific example of an electrophotographic image forming apparatus according to an embodiment of the present invention. FIG. 2 is a schematic cross-sectional view illustrating a configuration of a process cartridge according to an embodiment of the present invention. FIG. 3 is an exploded perspective view illustrating a configuration of a process cartridge according to an embodiment of the present invention. This full-color laser beam printer has a configuration in which process cartridges (hereinafter referred to as cartridges) 7a, 7b, 7c, and 7d are arranged in a line substantially in a vertical direction inside an apparatus body (hereinafter referred to as a "printer body") 100. The cartridges 7a to 7d are detachably attached to the printer body 100. The cartridges 7a to 7d have toner (developer) of the colors yellow (Y), magenta (M), cyan (C), and black (Bk), respectively. Photosensitive drums (image bearing members) 1a, 1b, 1c, and 1d are formed by coating an organic photoconductor layer (an OPC photosensitive member) on an outer circumferential surface of a cylinder. Moreover, the photosensitive drums 1a to 1d rotate in a counter-clockwise direction when one end of the cylinder receives the rotating power which is the driving power supplied from a motor which is a driving source. A process unit to be described later acts according to this rotating direction.

First, conductive rollers 2a, 2b, 2c, and 2d as a charging device uniformly charge the circumferential surfaces of the photosensitive drums 1a to 1d. In a state in which the conductive rollers 2a to 2d are in contact with the surfaces of the photosensitive drums 1a to 1d, a charging bias voltage is applied to uniformly charge the surfaces of the photosensitive drums 1a to 1d. Scanner units 3a, 3b, 3c, and 3d form electrostatic latent images on the photosensitive drums 1a to 1d by irradiating laser beams based on image information. The scanner units 3a to 3d are disposed substantially in a horizontal direction in relation to the shaft centers of the photosensitive drums 1a to 1d. Moreover, image light emitted by a laser diode, corresponding to an image signal is irradiated to polygonal mirrors 9a, 9b, 9c, and 9d that are rotated at a high speed by a scanner motor (not illustrated). The image light reflected from the polygonal mirrors 9a to 9d passes through imaging lenses 10a, 10b, 10c, and 10d to selectively expose the charged surfaces of the photosensitive drums 1a to 1d. In this way, electrostatic latent images (electrostatic images) are formed on the surfaces of the photosensitive drums 1a to 1d.

Developing apparatuses 4a, 4b, 4c, and 4d cause toner to adhere to the electrostatic latent images to develop the electrostatic latent images as toner images (developer images). As illustrated in FIG. 2, the developing apparatuses 4a to 4d have toner containers 41a, 41b, 41c, and 41d that store color toner of the respective colors Y, M, C, and Bk, respectively. The toner in the toner container 41a is conveyed to a toner supply roller (a developer supply member) 43a by a conveying mechanism 42a. Moreover, toner is applied to the outer circumference of a developing roller (a developer bearing member) 40a by a developing blade 44a which is in pressure-contact with the outer circumferences of a toner supply roller 43a and the developing roller 40a and charges are applied to the toner. The developing roller 40a is disposed to face the photosensitive drum 1a having an electrostatic latent image formed thereon. When a developing bias voltage is applied, a toner image corresponding to a latent image is formed on the photosensitive drum 1a. The developing apparatuses 4b, 4c, and 4d have the same configuration and perform the same operation as the developing apparatus 4a except for the toner color.

A transfer device 5 transfers the toner images formed on the photosensitive drums 1a to 1d to a sheet S which is a transfer material (a recording medium). That is, a transfer belt (an intermediate transfer member) 11 that circulates is arranged to make contact with and face all photosensitive drums 1a to 1d. The transfer belt 11 is stretched over four rollers, namely a driving roller 13, driven rollers 14a and 14b, and a tension roller 15, and moves so that the sheet S is electrostatically adsorbed to the outer circumferential surface on the left side of FIG. 1 and the sheet S comes into contact with the photosensitive drum 1. In this way, in a period in which the sheet S is conveyed from the driven roller 14a to the driving roller 13, the sheet S is conveyed up to a transfer position by the transfer belt 11 and the toner images on the photosensitive drums 1a to 1d are transferred to the sheet S. Moreover, transfer rollers 12a, 12b, 12c, and 12d are disposed in parallel at a position facing all photosensitive drums 1a to 1d in contact with the inner side of the transfer belt 11. Positive-polarity charges are applied from these transfer rollers 12a to 12d to the sheet S with the transfer belt 11 interposed therebetween, and negative-polarity toner images are transferred to the sheet S being in contact with the photosensitive drum 1 by the electric field of the charges.

Cleaning blades 6a, 6b, 6c, and 6d as a cleaning device remove transfer residual toner that remains on the surfaces of the photosensitive drums 1a to 1d after the transfer operation is performed. The printer body 100 further includes the following members and devices. A feeding unit 16 feeds and conveys the sheet S stored and stacked in a sheet feeding cassette 17 toward an image forming unit. When an image forming operation is performed, a sheet feeding roller 18 having a half-moon or D-cut shaped cross-section and a pair of registration rollers 19 rotate to feed the sheets S in the sheet feeding cassette 17 one by one. When the leading end thereof collides with the registration roller 19, the sheet S temporarily stops and forms a loop, and then, the sheet S is delivered to the transfer belt 11 while rotation of the transfer belt 11 is synchronized with an image writing position. A fixing unit 20 fixes a plurality of color toner images transferred to the sheet S. The fixing unit 20 has a rotary heating roller 21a and a pressure roller 21b that makes pressure-contact with the heating roller 21a to heat and pressurize the sheet S. The sheet S to which the toner images on the photosensitive drum 1 are transferred is heated and pressurized while being conveyed in a state of being pinched between the heating roller 21a and the pressure roller 21b when the sheet S passes through the fixing unit 20. With this process, a plurality of color toner images is fixed to the sheet S.

(Image Forming Operation)

During image formation, the cartridges 7a to 7d corresponding to the colors Y, M, C, and Bk are sequentially driven in synchronization with a printing timing, and the respective photosensitive drums 1a to 1d rotate in a counter-clockwise direction according to the driving. The scanner units 3a to 3d corresponding to the cartridges 7a to 7d are operated sequentially whereby the charging rollers 2a to 2d apply charges uniformly to the circumferential surfaces of the photosensitive drums 1a to 1d. The scanner units 3a to 3d perform exposure on the circumferential surfaces of the photosensitive drums 1a to 1d according to an image signal to form electrostatic latent images on the circumferential surfaces of the photosensitive drums 1a to 1d. The developing rollers 40a to 40d causes toner to move toward a low-potential portion of the electrostatic latent images to form (develop) toner images on the circumferential surfaces of the photosensitive drums 1a to 1d. At a timing at which a leading end of the toner image formed on the circumferential surface of the photosensitive drum 1a on the most upstream side is delivered to a facing point at which the leading end faces the transfer belt 11, the registration roller 19 starts rotating so that a print start position of the sheet S matches the facing point. The sheet S is fed to the transfer belt 11. The sheet S makes pressure-contact with the outer circumference of the transfer belt 11 so as to be pinched between an electrostatic adsorption roller 22 and the transfer belt 11, and a voltage is applied between the transfer belt 11 and the electrostatic adsorption roller 22. In this way, charges are induced on a dielectric layer of the transfer belt 11 and the sheet S which is a dielectric, and the sheet S is electrostatically adsorbed to the outer circumference of the transfer belt 11. By the electrostatic adsorption, the sheet S is stably adsorbed to the transfer belt 11 and is conveyed to a transfer unit on the most downstream side. When the sheet S is conveyed in this manner, toner images are sequentially transferred to the sheet S by the electric field formed between the photosensitive drums 1a to 1d and the transfer rollers 12a and 12d. The sheet S to which the toner images of the four colors Y, M, C, and Bk are transferred is separated from the transfer belt 11 by the curvature of the belt driving roller 13 and is loaded into the fixing unit 20. After the toner images are thermally fixed by the fixing unit 20, the sheet S is discharged outside the printer body 100 from a discharge unit 24 by a pair of discharge rollers 23 in a state in which an image surface thereof faces downward.

(Process Cartridge)

The cartridges 7a, 7b, 7c, and 7d have the same structure (the configuration illustrated in FIGS. 2 and 3). Thus, the configuration of the process cartridge will be described using the cartridge 7a as a representative example. That is, the cartridge 7a is a member in which process units such as the conductive roller 2a as a charging device that acts on the photosensitive drum 1a, the developing apparatus 4a, and the cleaning device 6a are integrated. In the present embodiment, the cartridge 7a includes a photosensitive drum unit (an image bearing member unit) 50a and the developing apparatus 4a.

Figure 8:
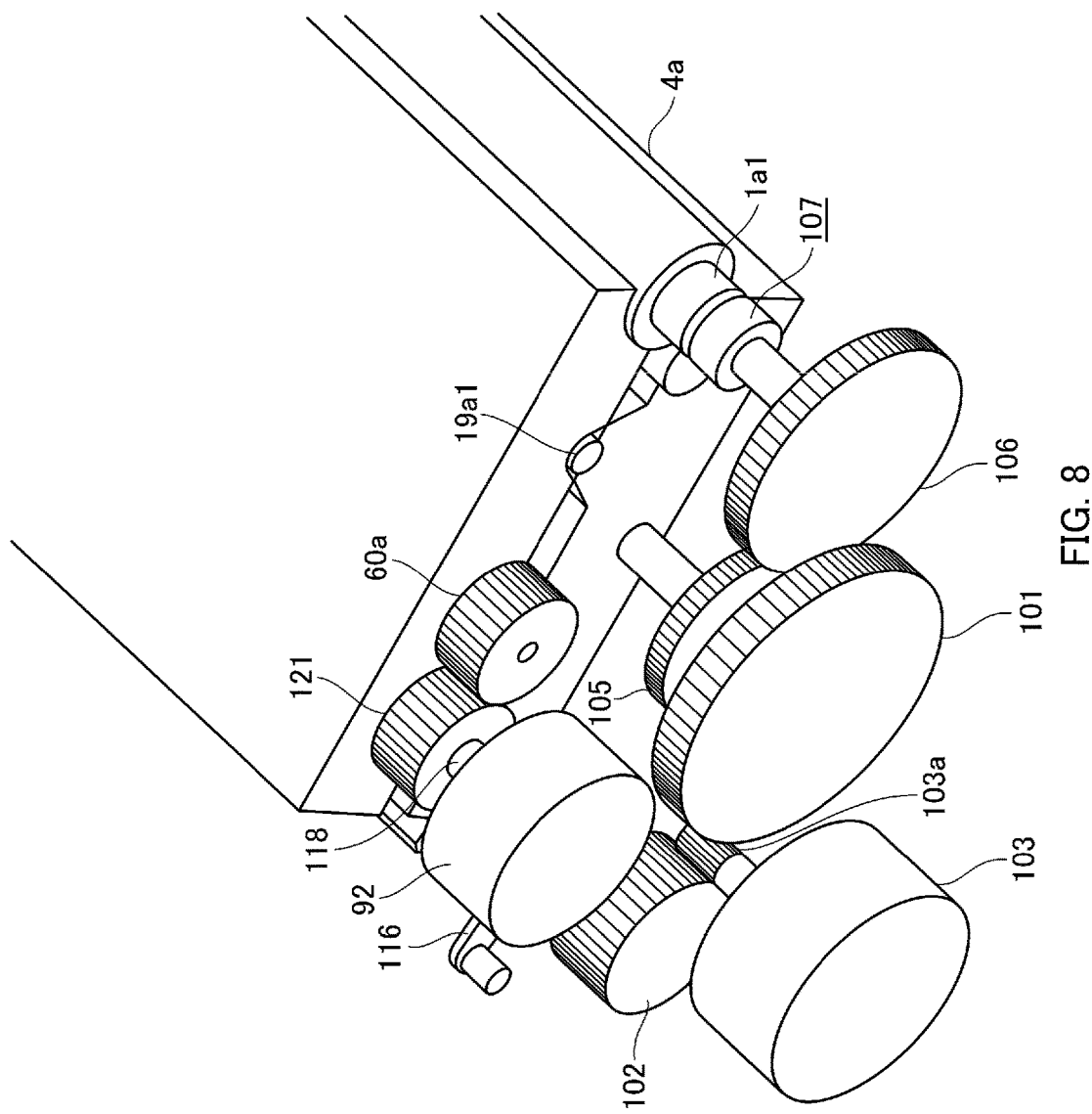
FIG. 8 is a perspective view of a process cartridge driving mechanism.

First, the photosensitive drum unit 50a will be described. The photosensitive drum 1a is rotatably supported on a cleaning frame 51a by bearings 31a1 and 31a2 which use bearings provided in the cleaning frame 51a. Moreover, as illustrated in FIG. 8, when the cartridge 7a is attached to the printer body 100, a coupling 107 provided in the printer body 100 engages with a coupling 1a1 provided at one end of the photosensitive drum 1a. Moreover, the rotating power of the driving motor 103 is transmitted to the photosensitive drum 1a via a motor gear 103a, a drum gear 101, gears 105 and 106, and the coupling 107. Moreover, the photosensitive drum 1a is rotated in the counter-clockwise direction according to an image forming operation. The charging device 2a and the cleaning blade 6a are disposed in such a form of sliding on the circumferential surface of the photosensitive drum 1a, and the cleaning blade 6a removes residual toner remaining on the circumferential surface of the photosensitive drum 1a. The residual toner removed by the cleaning blade 6a is sequentially conveyed to a waste toner chamber 53a provided on the back side of the cleaning frame 51a by the conveying mechanism 52a.

Next, the developing apparatus 4a will be described. The developing apparatus 4a includes respective members including the developing roller 40a which is a developing unit that rotates in the direction indicated by arrow Y in FIG. 2 in contact with the photosensitive drum 1a, the toner container 41a, and a developing frame 45a. The developing roller 40a is rotatably supported on the developing frame 45a with a bearing member interposed therebetween. Moreover, the toner supply roller 43a that rotates in the direction indicated by arrow Z in contact with the circumferential surface of the developing roller 40a and the developing blade 44a are disposed. The toner conveying mechanism 42a for stirring toner and feeding the toner to the toner supply roller 43a is provided in the toner container 41a. As illustrated in FIG. 8, when the cartridge 7a is attached to the printer body 100, the gear 121 provided in the printer body 100 engages with the gear 60a provided in the developing apparatus 4a. The rotating power of the driving motor 103 is transmitted to the gear 65a provided at one end side of the toner supply roller 43a from the gear 60a via the gears 61a, 62a, and 63a provided in the developing apparatus 4a to rotate the toner supply roller 43a. Furthermore, since the gear 65a engages with the gear 64a provided at one end side of the developing roller 40a, the rotating power is transmitted to the developing roller 40a and the developing roller 40a rotates.

The cartridge 7a is supported so that the entire developing apparatus 4a can swing in relation to the photosensitive drum unit 50a. That is, at one end side in the longitudinal direction of the cartridge 7a, a pin 49a1 is fitted to a hole 51a1 formed in the cleaning frame 51a and a supporting hole 47a1 formed in a bearing member 47a of the developing apparatus 4a. Moreover, at the other end side in the longitudinal direction of the cartridge 7, a pin 49a2 is fitted to a hole 51a2 formed in the cleaning frame 51a and a supporting hole 48a1 formed in a bearing member 48a of the developing apparatus 4a. In a state in which the cartridge 7a is placed alone before being attached to the printer body 100, the developing apparatus 4a is constantly biased by a pressing spring 54a so that the developing roller 40a makes contact with the photosensitive drum 1a by rotation momentum. A rib 46a is formed on the toner container 41a so as to protrude outside the container. That is, a developing roller separation mechanism to be described later, provided on the printer body 100 makes contact with the rib 46a to push the rib 46a upward, whereby the developing roller 40a is separated from the photosensitive drum 1a.

(Developing Roller Separation Mechanism)

Figure 4:
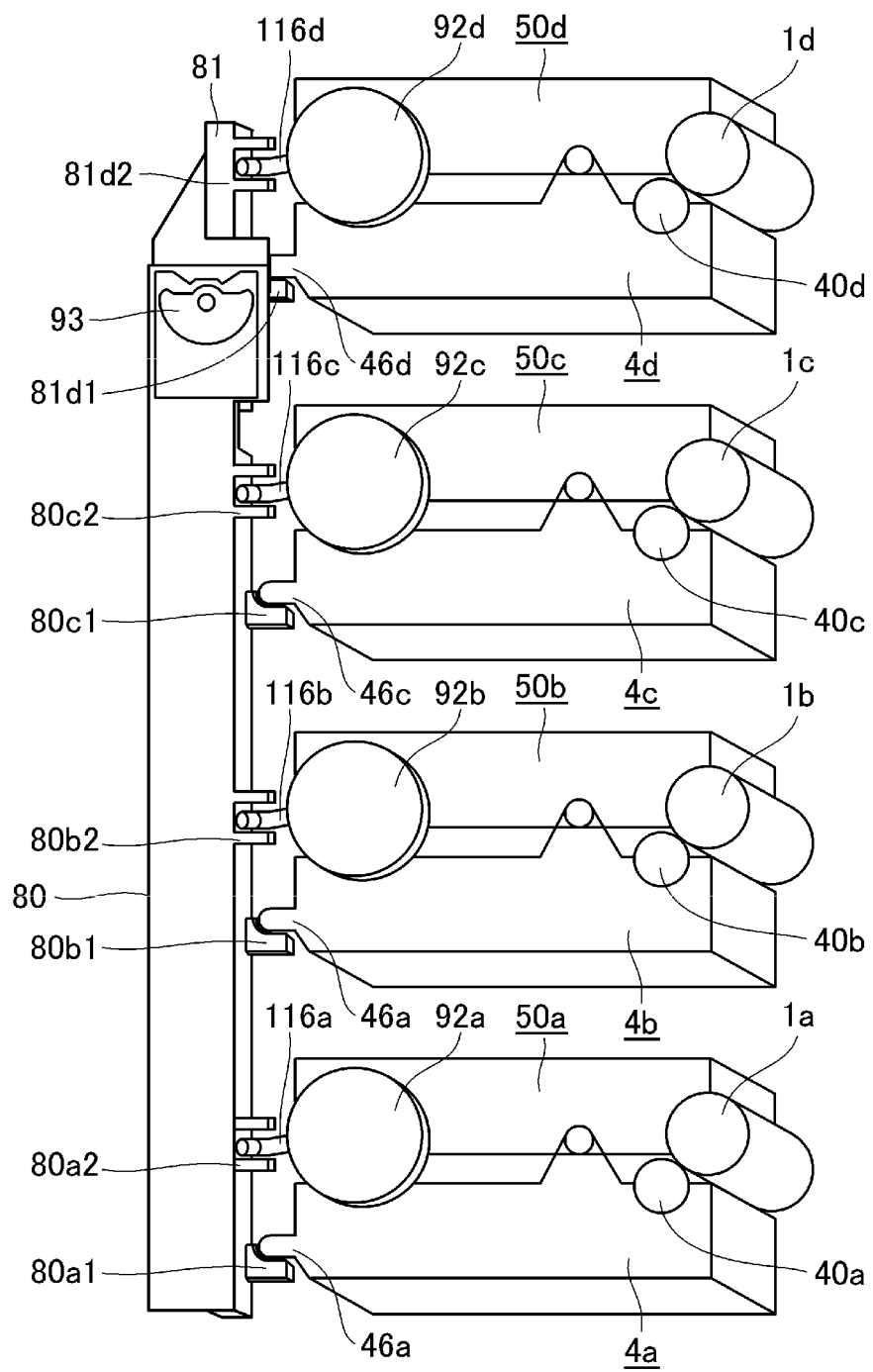
FIG. 4 is a perspective view of a process cartridge and a developing roller separation mechanism.
Figure 5:
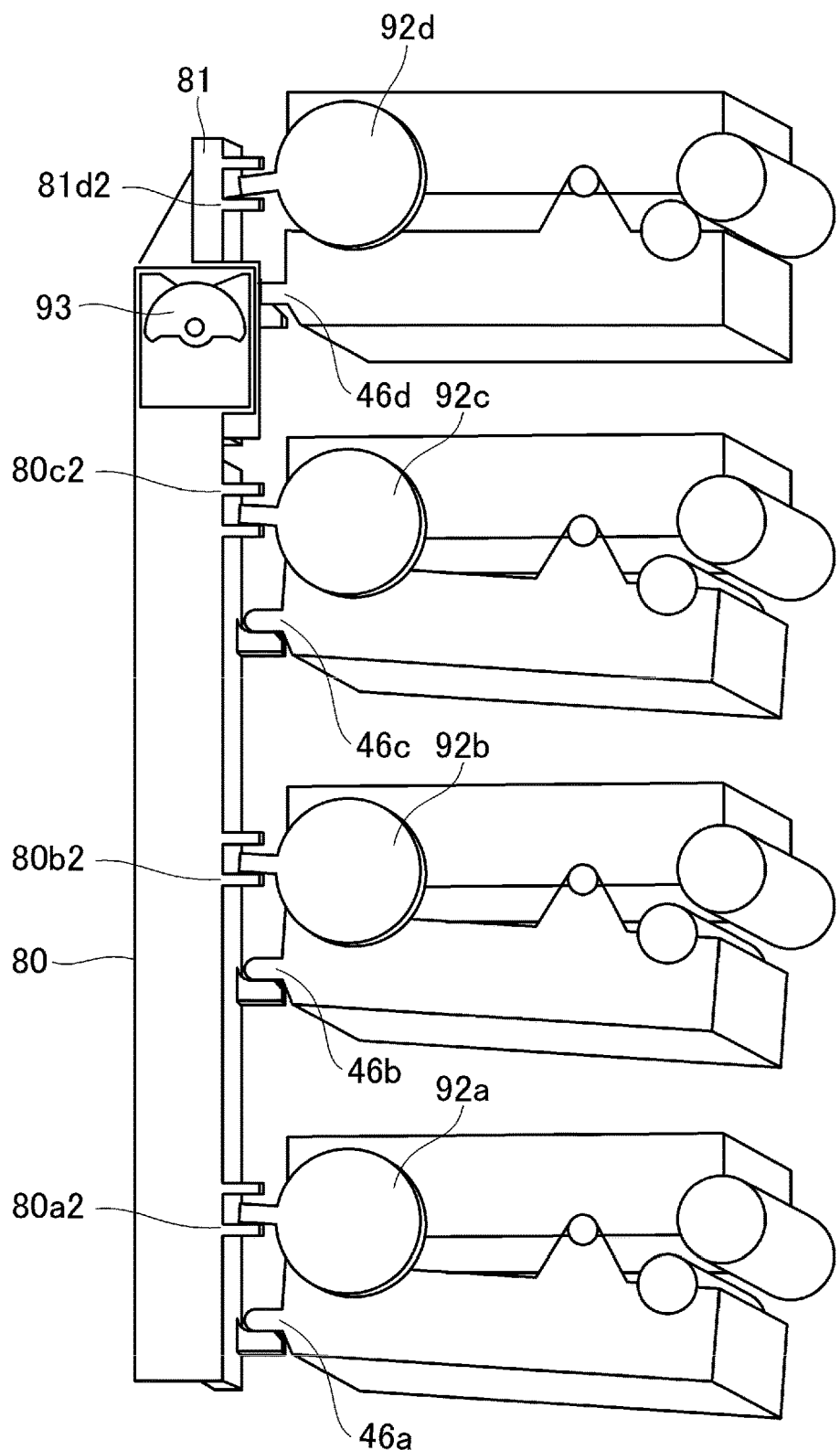
FIG. 5 is a perspective view of a process cartridge and a developing roller separation mechanism.
Figure 6:
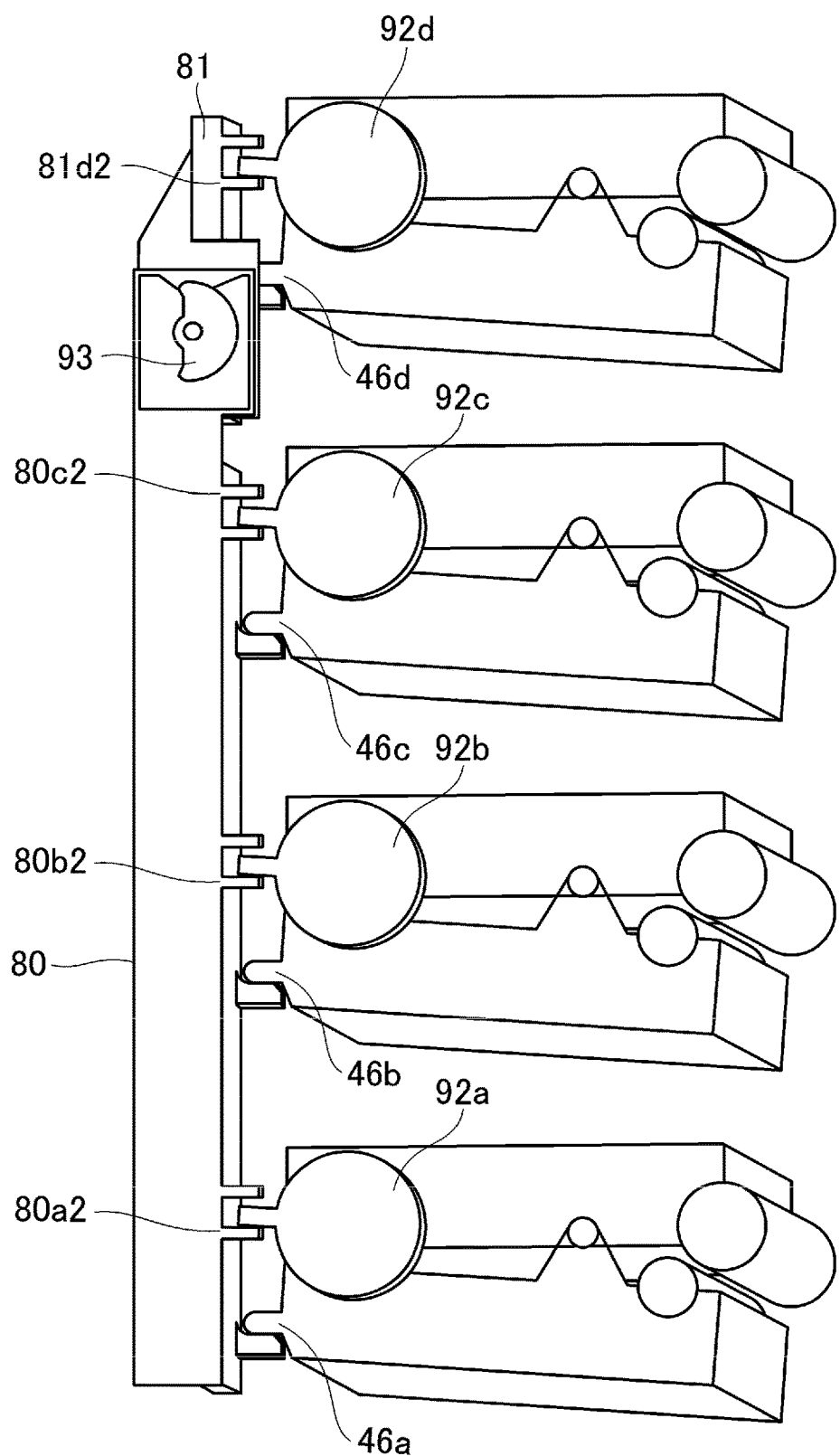
FIG. 6 is a perspective view of a process cartridge and a developing roller separation mechanism.
Figure 7:
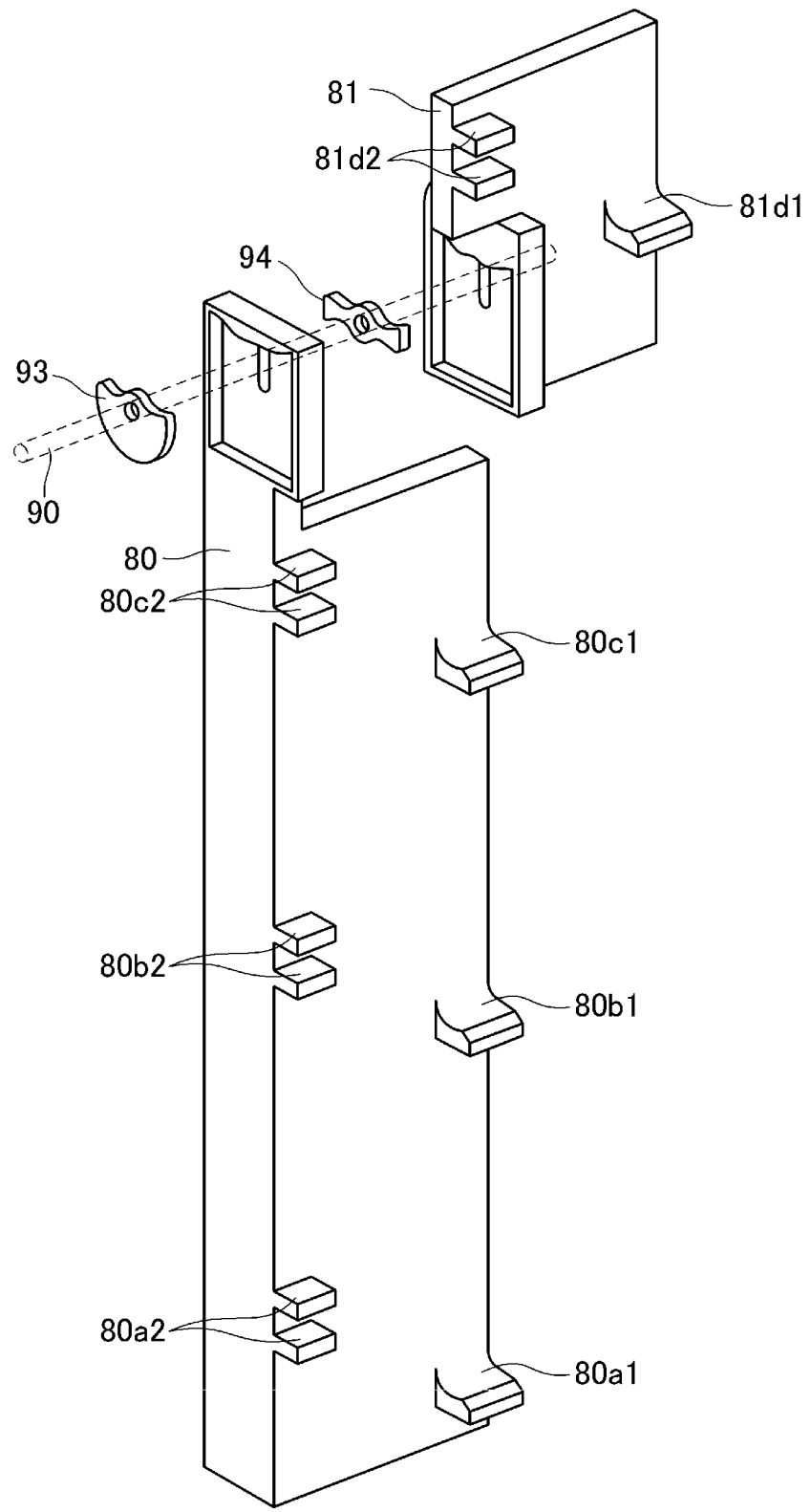
FIG. 7 is a perspective view of a developing roller separation mechanism.

The developing roller separation mechanism (a separation mechanism) provided on the printer body 100 will be described with reference to FIGS. 4 to 7. FIGS. 4 to 6 are schematic perspective views illustrating a process cartridge and a developing roller separation mechanism only and are diagrams for describing an operation of separating a developing roller from a photosensitive drum. FIG. 7 is an exploded perspective view illustrating a configuration of a developing roller separation mechanism. A developing roller separation mechanism including respective members to be described later are disposed inside the printer body 100. The developing roller separation mechanism separates the developing rollers 40a to 40d from the photosensitive drums 1a to 1d from a contact state while resisting against the spring biasing power acting on the developing apparatus 4.

As illustrated in FIGS. 4 to 7, a first rod member 81 and a second rod member 80 are provided for pushing upward the ribs 46a, 46b, 46c, and 46d formed on the respective developing apparatuses 4a to 4d. The first rod member 81 acts only on the developing apparatus 4d having black toner. Moreover, the second rod member 80 corresponds to the developing apparatuses 4a, 4b, and 4c having toner of the colors (Y, M, and C) other than black. First engagement portions 80a1, 80b1, and 80c1 having a projection shape and second engagement portions 80a2, 80b2, and 80c2 configured as a pair of two projections are formed on the second rod member 80 so as to protrude from the surface of the plate of the second rod member 80. When the second rod member 80 moves upward in the vertical direction, the first engagement portions 80a1, 80b1, and 80c1 move upward to push the developing unit-side ribs 46a, 46b, and 46c upward. By doing so, the developing apparatuses 4a, 4b, and 4c rotate about the pins 49a1 and 49a2 (see FIG. 3). Due to this, as illustrated in FIG. 5, the developing rollers 40a, 40b, and 40c disposed at the distal end sides of the developing apparatuses 4a, 4b, and 4c move away from the photosensitive drums 1a, 1b, and 1c. The positions of the respective developing apparatuses 4a, 4b, and 4c at that time are referred to as separation positions.

On the other hand, when the second rod member 80 moves downward, the second engagement portions 80a2, 80b2, and 80c2 are pushed downward by engaging with convex clutch levers 116a, 116b, and 116c provided on clutches (drive switching mechanisms) 92a, 92b, and 92c to be described later. As a result, when the clutch 92 is switched on (ON), the rotating power from the motor 103 is transmitted to the respective developing apparatuses 4a, 4b, and 4c. A first engagement portion 81d1 for realizing the same function as the other engagement portions and the second engagement portion 81d2 configured as a pair of projections are also provided on the first rod member 81.

The first and second rod members 81 and 80 moves in an up-down direction with the rotating power received from the motor 103 which is a driving source illustrated in FIG. 8. As illustrated in FIG. 7, by the driving power of the motor 103, a shaft 90 rotates and cams 94 and 93 fixed to the shaft 90 rotate. The cam 93 pushes the second rod member 80 upward or downward and the cam 94 pushes the first rod member 81 upward or downward. The cams 93 and 94 are configured so that the timing at which the second rod member 80 is moved is offset from the timing at which the first rod member 81 is moved. That is, the cams 93 and 94 are configured so that a state in which the developing rollers 40a, 40b, and 40c are separated from the photosensitive drums 1a, 1b, and 1c and the developing roller 40d is in contact with the photosensitive drum 1d or the opposite state can be created. Therefore, for example, the developing roller 40d only can be separated from the photosensitive drum 1d when the black (Bk) developing apparatus 4d which is highly frequently used (of which the toner consumption is severe) is replaced. Moreover, when a black image is printed, the developing roller 40d and the photosensitive drum 1d in the developing apparatus 4d to be used only are brought into contact with each other whereas the developing roller and the photosensitive drum in the other developing apparatuses 4a to 4c which are not used are separated from each other so that aging resulting from continuation of the contact state can be suppressed.

(Cartridge Driving Mechanism)

FIG. 8 is a schematic perspective view illustrating a configuration of a driving mechanism for driving a cartridge. This driving mechanism is provided in the respective cartridges 7a to 7d, and the driving motor 103 is also provided in the respective cartridges. The rotating power output from the driving motor 103 is distributed to the drum gear 101 that drives the photosensitive drum 1 and a drive train that drives the developing roller 40. The drive train of the developing roller 40 is connected to the clutches 92a, 92b, 92c, and 92d via a motor gear 103a and an idler gear 102. By switching the clutch 92 ON and OFF, it is possible to transmit or cut the rotating power of the developing roller 40 during rotation of the photosensitive drum 1.

The clutch 92 is switched ON and OFF when the first and second rod members 81 and 80 move in the up-down direction. That is, the switching is realized when the engagement portions 80a2, 80b2, 80c2, and 81d2 push the clutch levers 116a to 116d of the clutches 92a to 92d upward or downward, respectively. For example, as illustrated in FIG. 6, when the clutch levers 116a to 116d are positioned on the upper side by being pushed upward by the engagement portions 80a2 to 80c2 and 81d2, the clutches 92a to 92d are in the OFF state. In this state, the rotating power of the motor 103 is not transmitted to the developing rollers 40a to 40d, and the developing rollers 40a to 40d at that time are separated from the photosensitive drums 1a to 1d. This state of the first and second rod members 81 and 80 is referred to as a non-operating state. In contrast, when the clutch levers 116a to 116d are positioned on the lower side by being pushed downward by the engagement portions 80a2 to 80c2 and 81d2, the clutches 92a to 92d are in the ON state. In this state, the rotating power of the motor 103 is transmitted and the developing rollers 40a to 40d rotate. In this case, the developing rollers 40a to 40d are in contact with the photosensitive drums 1a to 1d, respectively.

(Clutch)

The details of a mechanical clutch 92 which is a drive transmission device according to an embodiment of the present invention will be described with reference to FIG. 9.

Figure 9:
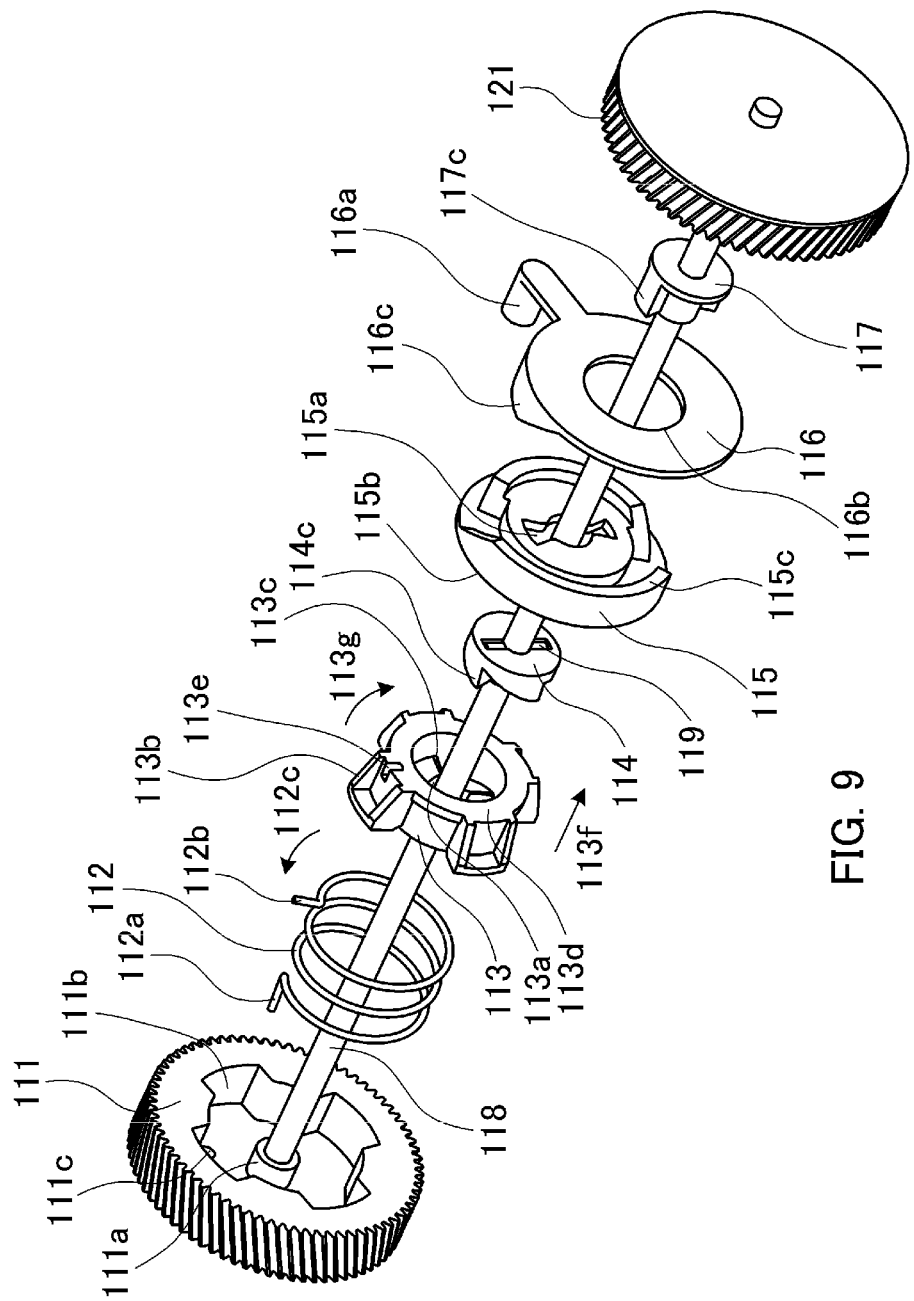
FIG. 9 is an exploded perspective view of a drive transmission device according to the first embodiment.

FIG. 9 is an exploded perspective view of a drive transmission device (the clutch 92) according to the present embodiment. The gear 111 as a first rotating member is supported so as to be rotatable in relation to a clutch shaft 118 as a second rotating member. The gear 111 is connected to the idler gear 102 (FIG. 8) and rotates by obtaining the driving power from the driving motor 103 and inputs the rotational driving power of the driving motor 103 to the clutch. The gear 111 has such a shape that a region of a surface facing the gear 121 disposed between an outer circumferential surface-side portion (an outer circumference portion) in which teeth are formed and an inner circumference-side portion (an inner circumference portion) near the center of rotation in which the clutch shaft 118 is inserted has a hollow shape depressed in the axial direction. The gear 111 has a sliding boss 111a formed at the center of rotation and the clutch shaft 118 is inserted in the inner circumference thereof. The sliding boss 111a has an inner circumference which serves as a positioning and sliding surface in relation to the clutch shaft 118 which is a driven-side rotating member and has an outer circumference which serves as a positioning and sliding surface in relation to the driving-side engagement member 113. Four rotation stoppers (depressed portions) 111b having a shape depressed in a radial direction away from the center of rotation are formed on the inner side of the outer circumferential surface-side portion of the gear 111 and serve as a rotation stopper of the driving-side engagement member 113.

The driving-side engagement member 113 is provided in the gear 111 so as to be movable in the axial direction along the rotating shaft of the gear 111 between an engagement position at which the driving-side engagement member 113 engages with a driven-side engagement member 114 as a driving-side engagement member and a non-engagement position at which the members do not engage with each other. Specifically, the driving-side engagement member 113 is supported so as to be slidable and rotatable in relation to the gear 111 when the inner circumferential surface 113a is fitted to the outer circumference portion of the sliding boss 111a of the gear 111. Simultaneously, the driving-side engagement member 113 rotates in synchronization with the gear 111 when rotation stoppers 113b (protruding portions) formed on the outer circumference portion are inserted in the rotation stoppers 111b (the depressed portions) of the gear 111 and the rotation stoppers 113b and the rotation stoppers 111b are in the contact state in the rotating direction. In the present embodiment, the engagement position indicates all positions in the movable range of the driving-side engagement member 113, included in a range in which the driving-side engagement member 113 and the driven-side engagement member 114 are in the engagement state. Similarly, the non-engagement position indicates positions other than the engagement position, that is, all positions in the movable range of the driving-side engagement member 113, included in a range in which the driving-side engagement member 113 and the driven-side engagement member 114 are not in the engagement state. The rotation stoppers 113b protruding in the radial direction away from the center of rotation have a width (the width in the rotating direction) which is intentionally narrowed in relation to the rotation stoppers 111b of the gear 111. Due to this, the driving-side engagement member 113 has a backlash in the rotating direction in relation to the gear 111. Moreover, four projections 113c that protrude in the axial direction are formed on the driving-side engagement member 113, and rotation can be transmitted when these projections 113c engage with projections 114c formed on the driven-side engagement member 114. A drive transmission surface of the projection 113c is formed to be inclined in a direction in which the projection 113c bites into a counterpart member with rotation. Due to this, a reliable engagement state is created once the projections engage with each other, and tooth jumping does not easily occur even when large torque is applied.

A compression torsion spring 112 as a biasing member is disposed between the gear 111 and the driving-side engagement member 113. One end 112a of the compression torsion spring 112 is inserted in a hole 111c of the gear 111 and the other end 112b is inserted in a hole 113e of the driving-side engagement member 113. The compression torsion spring 112 is assembled in a state of being compressed in the axial direction and twisted in the direction indicated by arrow 112c. In this way, the driving-side engagement member 113 is always biased with first biasing power in the direction (arrow 113f) of the driven-side engagement member 114 by the compression torsion spring 112 and is biased with second biasing power in the rotating direction (arrow 113g) of the gear 111. That is, the compression torsion spring 112 is a biasing member that biases the driving-side engagement member 113 to be moved to an engagement position at which the driving-side engagement member 113 engages with the driven-side engagement member 114. In other words, the biasing member 112 is a biasing member that biases at least one of the driving-side engagement member 113 and the driven-side engagement member 114 with the first biasing power in a direction which corresponds to the central line of rotation of the first rotating member 111 and in which the driving-side engagement member 113 and the driven-side engagement member 114 engage with each other. Moreover, the compression torsion spring 112 is a restricting member that applies biasing power to the driving-side engagement member 113 to restrict movement in the rotating direction of the driving-side engagement member 113 so that the driving-side engagement member 113 remains at a position (a non-transmission position) away from a position (a transmission position) at which the driving-side engagement member 113 engages with the rotation stoppers 111b of the gear 111. In the present embodiment, the non-transmission position indicates positions other than the transmission position, that is, all positions in the movable range in the rotating direction of the driving-side engagement member 113, included in the range excluding the transmission position.

The driven-side engagement member 114 is connected to the clutch shaft 118 by a parallel pin 119. Moreover, four projections 114c that protrude in the axial direction are formed on the driven-side engagement member 114, and rotation is transmitted when the projections 114c engage with the projections 113c of the driving-side engagement member 113. A drive transmission surface of the projection 114c is inclined in a biting direction similarly to the counterpart member 113c. In this manner, the driving-side engagement member 113 and the driven-side engagement member 114 have a plurality of drive transmission surfaces which is inclined in a direction in which the members bite each other when they engage with each other, and the drive transmission surfaces are disposed symmetrically in relation to the center of rotation. The rotation transmitted from the driven-side engagement member 114 to the rotating shaft 118 is transmitted from the gear 121 fixed to the end to the developing roller 40 of the process cartridge 7.

In the present embodiment, the clutch lever 116 and the release member 115 are provided as a pair of cam members provided to variably apply power resisting the first biasing power of the compression torsion spring 112 to the driving-side engagement member 113. Specifically, a cam portion 116c is provided in the clutch lever 116 as the other cam member, and the cam portion 116c makes contact with a cam portion 115c of the release member 115 as one cam member to control the position in the axial direction of the release member 115. Moreover, the cam portions 115c and 116c have a plurality of uneven portions (in the present embodiment, two sets of depressed portions and protruding portions are formed) of which the height in the axial direction changes in the rotating direction (the circumferential direction), which are formed in the mutual facing surfaces. In this way, it is possible to prevent an increase in the possibility of malfunction and operating resistance resulting from inclination of the release member 115.

The release member 115 is supported so as to be movable in the axial direction in a state in which the rotation is restricted when a sliding portion 115a on the inner side is fitted to a sliding portion 117c of the bearing member 117. The cam portion 115c of the release member 115 has a shape corresponding to the cam portion 116c of the clutch lever 116. The cam portion 115c of the release member 115 makes contact with the cam portion 116c of the clutch lever 116 whereby the position in the axial direction of the release member 115 is determined. Moreover, a sliding portion 115b on the opposite side of the cam portion 115c of the release member 115 makes contact with a sliding surface 113d of the driving-side engagement member 113 whereby the position of the driving-side engagement member 113 is determined.

That is, in a state in which the ridge of the cam portion 116c of the clutch lever 116 meets the ridge of the cam portion 115c of the release member 115 (a state in which the distal ends of the respective protruding portions make contact with each other in the axial direction), the release member 115 is pushed toward the gear 111. That is, the power (the power of compressing the compression torsion spring 112 in the axial direction) resisting the first biasing power of the compression torsion spring 112, applied to the driving-side engagement member 113 by the pair of cam members increases (strengthens). In this way, the sliding portion 115b makes contact with the sliding portion 113d of the driving-side engagement member 113 to separate the driving-side engagement member 113 from the driven-side engagement member 114 against the compression torsion spring 112 (the driving-side engagement member 113 is moved to the non-engagement position). Therefore, a so-called clutch disengagement state is created.

On the other hand, in a state in which the clutch lever 116 is turned so that the ridge of the cam portion 116c of the clutch lever 116 meets the groove of the cam portion 115c of the release member 115 (a state in which one protruding portion is fitted to the other depressed portion), the release member 115 is moved toward the driven-side gear 121. That is, when one of a pair of cam members is rotated around the axial direction in relation to the other cam member so that the protruding portion formed on one cam member is fitted to the depressed portion formed in the other cam member while sliding on the inclination surface of the depressed portion, the relative position in the axial direction of one cam member in relation to the other cam member changes. Due to this change in the relative position, the power (the power of compressing the compression torsion spring 112 in the axial direction) resisting the first biasing power of the compression torsion spring 112, applied to the driving-side engagement member 113 by the pair of cam members decreases (weakens). In this way, the driving-side engagement member 113 engages with the driven-side engagement member 114 by being pressed toward the engagement position from the non-engagement position by the elastic power of the engagement member biasing spring 112. Therefore, the clutch is connected and rotation is transmitted.

The operation of the clutch 92 will be described in detail with reference to FIGS. 10A to 10D. The diagrams on the left side of FIGS. 10A to 10D are cross-sectional views vertical to the rotating shaft, illustrating the gear 111, the compression torsion spring 112 and the driving-side engagement member 113 only, and the diagrams on the right side are cross-sectional views along the rotating shaft of the clutch.

Power applying portions 111pa in FIGS. 10A and 10D are formed in the first rotating member 111. Power receiving portions 113pr are formed in the driving-side engagement member 113. When the power applying portions 111pa engage with the power receiving portions 113pr, the driving power of the first rotating member 111 can be transmitted to the driving-side engagement member 113.

FIG. 10A is a diagram illustrating a state in which the clutch is disengaged. In this state, the clutch lever 116 is operated by the rod member 80 (FIGS. 4 to 8) and the cam portion 116c of the clutch lever 116 is in contact with the cam portion 115c of the release member 115. In this case, the driving-side engagement member 113 is pushed by the release member 115 and the projection 113c of the driving-side engagement member 113 is separated from the projection 114c of the driven-side engagement member 114. Therefore, the clutch is disengaged and the rotation of the driving-side engagement member 113 is not transmitted to the driven-side engagement member 114. Moreover, the driving-side engagement member 113 is biased with the second biasing power in the rotating direction by the compression torsion spring 112. Therefore, the rotation stopper 113b of the driving-side engagement member 113 is pulled in the rotating direction within the rotation stopper 111b of the gear 111 so that a gap A is formed on the opposite side in the rotating direction. That is, when the driving-side engagement member 113 is not in engagement with the driven-side engagement member 114, the power applying portion 111pa and the power receiving portion 113pr are separated by the second biasing power.

FIG. 10B is a diagram illustrating the state immediately when the distal end of the projection 113c of the driving-side engagement member 113 makes contact with the distal end of the projection 114c of the driven-side engagement member 114. The clutch lever 116 rotates, the inclination surface of the cam portion 116c of the clutch lever 116 starts making contact with the inclination surface of the cam portion 115c of the release member 115, and the release member 115 and the driving-side engagement member 113 are operated by the spring power of the compression torsion spring 112. The projections 113c of the driving-side engagement member 113 and the projections 114c of the driven-side engagement member 114 each are formed at four positions, and there are various phases at which the projections 113c and 114c start engaging each other. FIG. 10B illustrates a worst engagement state, that is, a state in which the distal end of the projection 113c of the driving-side engagement member 113 makes contact with the distal end of the projection 114c of the driven-side engagement member 114. That is, the projections 113c and 114c make contact with each other in the rotating direction within a very small range of area. The rotation stopper 113b of the driving-side engagement member 113 is pulled in the rotating direction by the second biasing power within the rotation stopper 111b of the gear 111 similarly to FIG. 10A so that a gap A is formed on the opposite side in the rotating direction.

FIG. 10C is a diagram illustrating a state immediately when the projection 113c of the driving-side engagement member 113 and the projection 114c of the driven-side engagement member 114 are in perfect engagement. The cam portion 116c of the clutch lever 116 and the cam portion 115c of the release member 115 further move along the inclination surface, and the release member 115 and the driving-side engagement member 113 are further operated by the spring power of the compression torsion spring 112. The driving-side engagement member 113 stops rotating to cause a delay in relation to the gear 111 from a time point at which the distal end of the projection 113c of the driving-side engagement member 113 makes contact with the distal end of the projection 114c of the stopped driven-side engagement member 114 in FIG. 10B. Since the load torque of the driven-side engagement member 114 is large, the driving-side engagement member 113 does not rotate. The gap A decreases in the state of FIG. 10C and a gap B is formed on the opposite side. That is, since the first rotating member 111 rotates while resisting the second biasing power, the gap B is formed.

FIG. 10D illustrates a state immediately when the rotation stopper 113b (the power receiving portion 113pr) of the driving-side engagement member 113 collides with the rotation stopper surface (the power applying portion 111pa) on the opposite side of the rotation stopper 111b of the gear 111. In this case, the driven-side engagement member 114 restarts rotating to rotate the clutch shaft 118 and the gear 121. That is, a state in which the driving-side engagement member 113 engages with the gear 111 is created after the driving-side engagement member 113 and the driven-side engagement member 114 create a perfect engagement state (FIG. 10C) (that is, a state in which the power receiving portion 113pr engages with the power applying portion 111pa), whereby the rotational driving power transmitted via the gear 111 is transmitted to the clutch shaft 118.

The relation of power and the size of the gap for implementing the present embodiment will be described with reference to FIGS. 10A to 10D. First, a condition for allowing the driving-side engagement member 113 and the driven-side engagement member 114 to reliably engage with each other with the power of the compression torsion spring 112 in the state of FIG. 10B will be described. In the state of FIG. 10B, the power that the compression torsion spring 112 presses the driving-side engagement member 113 in the axial direction is defined as F11 (the first biasing power) and the power that the compression torsion spring 112 presses the driving-side engagement member 113 in the rotating direction is defined as F21 (the second biasing power). Moreover, a frictional coefficient between the driving-side engagement member 113 and the driven-side engagement member 114 is defined as μ1. A resisting power against the driving-side engagement member 113 moving in the axial direction in a state in which the distal end of the projection 113c of the driving-side engagement member 113 is in contact with the distal end of the projection 114c of the driven-side engagement member 114 is defined as μ1×F21. The following expression is to be satisfied since the compression torsion spring 112 has to press the driving-side engagement member 113 in the axial direction with a power greater than the resisting power.

$$F11 > \mu1 \times F21 \quad (1)$$

Next, a condition in which, in the state of FIG. 10A, the driving-side engagement member 113 is reliably backlash gathered in relation to the gear 111 with the power in the rotating direction of the compression torsion spring 112 will be described. In the state of FIG. 10A, the power that the compression torsion spring 112 presses the driving-side engagement member 113 in the axial direction is defined as F12 and the power that the compression torsion spring 112 presses the driving-side engagement member 113 in the rotating direction is defined as F22. Moreover, a frictional coefficient between the driving-side engagement member 113 and the release member 115 is μ2. The resisting power that suppresses the backlash gathering of the driving-side engagement member 113 due to sliding resistance between the driving-side engagement member 113 and the release member 115 when the driving-side engagement member 113 is rotating is defined as μ2×F12. The following expression is to be satisfied since the compression torsion spring 112 has to press the driving-side engagement member 113 in the rotating direction with a power greater than the resisting power.

$$F22 > \mu2 \times F12 \quad (2)$$

Next, the size of the necessary gap A will be described with reference to FIGS. 10B to 10D. As an operation timing, the gap A needs to remain in the state of FIG. 10C in which the projection 113c of the driving-side engagement member 113 is in perfect engagement with the projection 114c of the driven-side engagement member 114. When the gap A remains, it is possible to decrease the spring power of the compression torsion spring 112. The time required for the projections 113c and 114c to make perfect engagement after the distal end of the projection 113c of the driving-side engagement member 113 makes contact with the distal end of the projection 114c of the driven-side engagement member 114 is defined as t1. Here, the state (perfect engagement state) in which the projections 113c and 114c are in perfect engagement is a state in which both are in contact with each other in the axial direction and are immovable in the axial direction. Moreover, the time required for the gap A to disappear after the distal end of the projection 113c of the driving-side engagement member 113 makes contact with the distal end of the projection 114c of the driven-side engagement member 114 is defined as t2. Here, the time required for the gap A to disappear is the time required for the driving-side engagement member 113 to reach the transmission position. In this case, the following expression is to be satisfied.

$$t1 < t2 \quad (3)$$

Expression (1) does not have any term related to load torque. This is the effect of backlash gathering realized by the gap A and the compression torsion spring 12, which is the feature of the present embodiment. The expression (1) cannot be applied unless the gap remains in the state of FIG. 10C. When a value obtained by converting load torque T to the engagement portion between the projections of the driving-side engagement member 113 and the driven-side engagement member 114 is defined as F3, a condition for allowing the driving-side engagement member 113 and the driven-side engagement member 114 to make reliable engagement is expressed by the following expression.

$$F11 > \mu1 \times F3 \quad (4)$$

Figure 11:
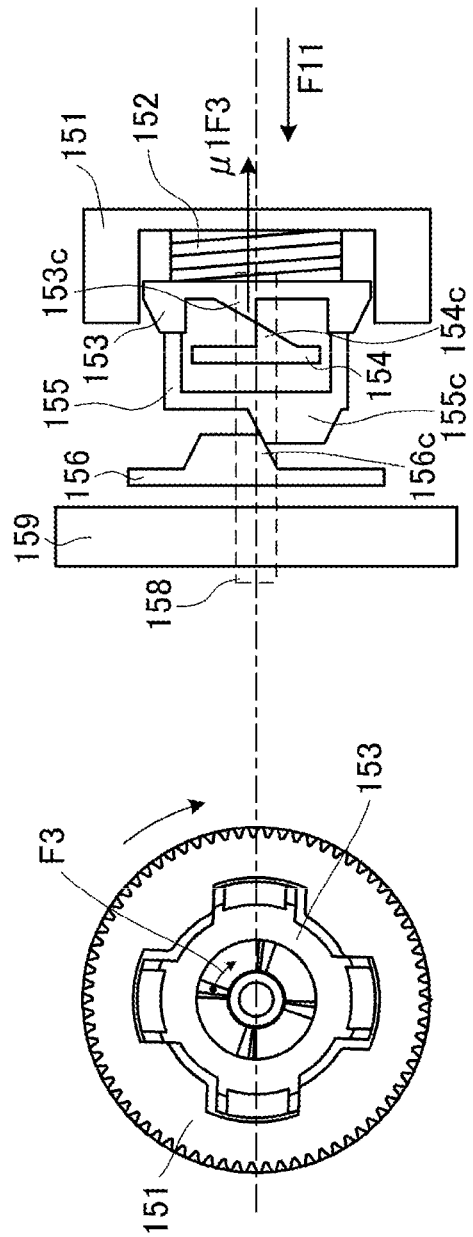
FIG. 11 is a cross-sectional view of a drive transmission device according to a conventional example.

When the expressions (1) and (4) are compared, F21 is replaced with F3. F3 is remarkably greater than F21 unless the load torque T is very small although it depends on conditions. F11 also increases as F3 increases. That is, a reliable engagement state is not obtained unless F11 is increased. If F11 is increased, the outbreak noise generated when the driving-side engagement member 113 collides with the driven-side engagement member 114 increases. As illustrated in FIG. 11, the configuration disclosed in Japanese Patent Application Publication No. 2003-208024 does not include a backlash gathering constitution, and thus the condition for the driving-side engagement member 153 and the driven-side engagement member 154 to make reliable engagement is expressed by the expression (4). That is, in the conventional configuration, loud outbreak noise is generated.

In the present embodiment, by satisfying the expressions (1) to (3), it is possible to allow the driving-side engagement member 113 and the driven-side engagement member 114 to reliably engage with each other and to improve the reliability of the operation of the clutch even when the spring power of the compression torsion spring 112 is decreased. Moreover, since the spring power of the compression torsion spring 112 can be decreased, it is possible to remarkably reduce the outbreak noise generated when the driving-side engagement member 113 collides with the driven-side engagement member 114. Furthermore, in the present embodiment, since the compression torsion spring 112 provides the functions of a compression spring and a torsion coil spring, it is possible to save the cost and the space.

Second Embodiment

Figure 12:
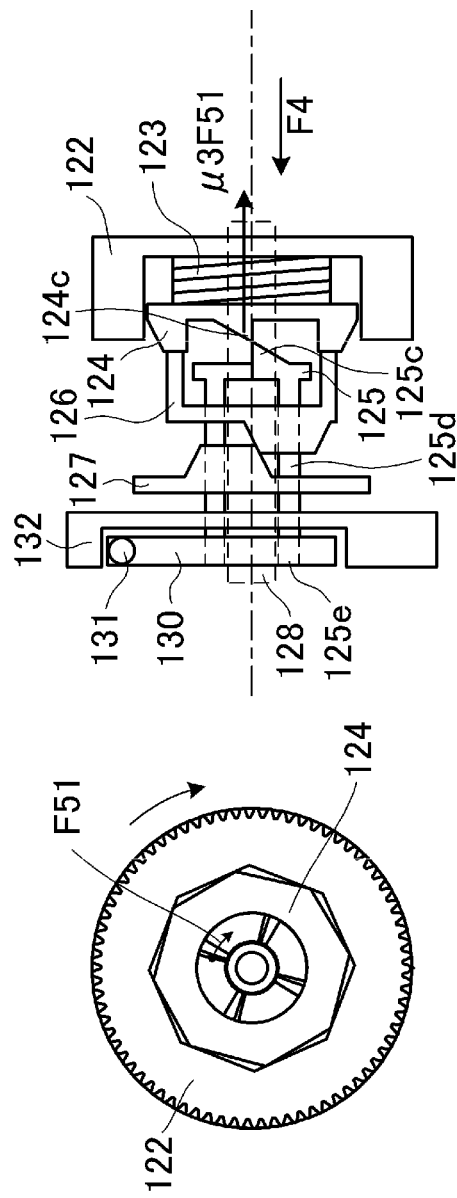
FIG. 12 is a cross-sectional view of a drive transmission device according to a second embodiment.
Figure 13:
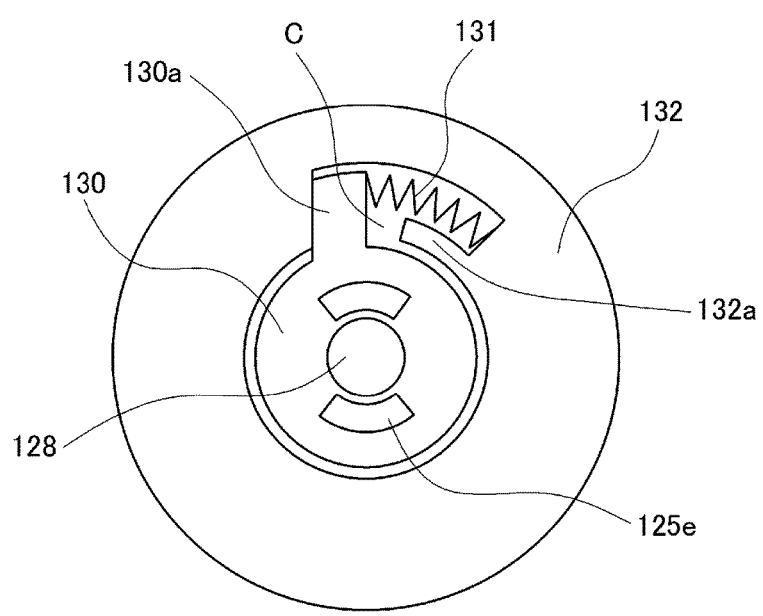
FIG. 13 is a cross-sectional view illustrating a configuration of backlash gathering of the second embodiment.

FIGS. 12 and 13 illustrate a clutch of a second embodiment. The matters that are not described in the second embodiment are the same as those of the first embodiment. A clutch shaft 128 is a fixed shaft that does not rotate. A driving-side engagement member 124 has an approximately octagonal shape when seen in the axial direction, and a hollow portion of a gear 122 (a first rotating member) corresponding to the driving-side engagement member 124 also has an octagonal shape when seen in the axial direction. A compression spring 123 is a general compression spring that does not generate power in a torsional direction and presses the driving-side engagement member 124 with the first biasing power toward a driven-side engagement member 125. The rotation transmitted to the driven-side engagement member 125 is transmitted to an intermediate member 130 via a rotation stopper 125e at a distal end of a boss 125d formed integrally with the driven-side engagement member 125.

A gear 132 (a second rotating member) is rotatably held on the clutch shaft 128. A gap C is formed between a projection 130a of the intermediate member 130 and a rib 132a of the gear 132. Moreover, a compression spring 131 that applies the second biasing power so that the gap C is formed is stretched between the intermediate member 130 and the gear 132. This gap is set to be formed on a side away from an engagement portion. When a state in which the projection 130a and the rib 132a make contact with each other in the rotating direction while filling the gap C is created, the rotating power of the driven-side engagement member 125 is transmitted to the intermediate member 130 and the gear 132.

Next, the relation of power and the size of the gap for implementing the present embodiment will be described. First, a condition for allowing the driving-side engagement member 124 and the driven-side engagement member 125 to reliably engage with each other with the power of the compression spring 123 will be described. The power that the compression spring 123 presses the driving-side engagement member 124 in the axial direction is defined as F4, and the power that the compression spring 131 presses the driving-side engagement member 124 in the rotating direction via the intermediate member 130, the parallel pin 129, the clutch shaft 128, and the driven-side engagement member 125 is defined as F51. Moreover, a frictional coefficient between the driving-side engagement member 124 and the driven-side engagement member 125 is defined as µ3. A resisting power against the driving-side engagement member 124 moving in the axial direction in a state in which the distal end of the projection 124c of the driving-side engagement member 124 is in contact with the distal end of the projection 125c of the driven-side engagement member 125 is µ3×F51. The following expression is to be satisfied since the compression spring 123 has to press the driving-side engagement member 124 in the axial direction with a power greater than the resisting power.

$$F4 > \mu 3 \times F51 \quad (5)$$

Next, the size of the necessary gap C will be described. As an operation timing, the gap C needs to remain when the projection 124c of the driving-side engagement member 124 is in perfect engagement with the projection 125c of the driven-side engagement member 125. When the gap C remains, it is possible to decrease the spring power of the compression spring 123. The time required for the projections 124c and 125c to make perfect engagement after the distal end of the projection 124c of the driving-side engagement member 124 makes contact with the distal end of the projection 125c of the driven-side engagement member 125 is defined as t3. Moreover, the time required for the gap C to disappear after the distal end of the projection 124c of the driving-side engagement member 124 makes contact with the distal end of the projection 125c of the driven-side engagement member 125 is defined as t4. In this case, the following expression is to be satisfied.

$$t3 < t4 \quad (6)$$

When the clutch is disengaged, since the resisting power that suppresses the backlash gathering of the intermediate member 130 does not act, it is not necessary to satisfy the condition corresponding to expression (2) of the first embodiment. According to the configuration of the present embodiment, even when the distal end of the projection 124c of the driving-side engagement member 124 makes contact with the distal end of the projection 125c of the driven-side engagement member 125, it is possible to allow the projections to reliably engage with each other with a weak spring power regardless of load torque. In the present embodiment, a compression spring that presses the driving-side engagement member 124 toward the driven-side engagement member 125 and a compression spring for creating a gap in the rotating direction in the drive train are formed separately. When separate springs are used, it is possible to easily control the necessary spring power. Moreover, since the gap is formed on the downstream side of the clutch, no power that removes the gap acts when the clutch is disengaged. Therefore, the degree of freedom in design is higher than the first embodiment.

Third Embodiment

Figure 14:
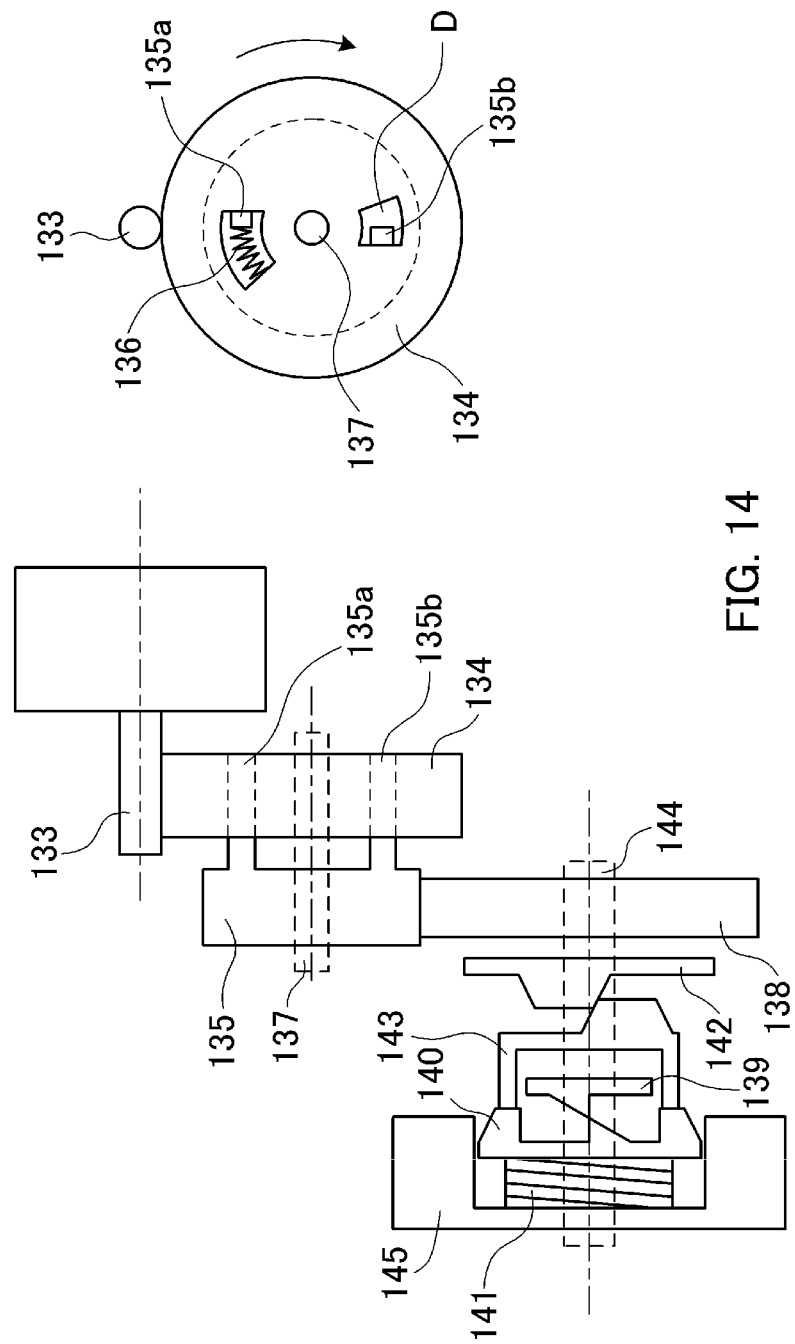
FIG. 14 is a cross-sectional view illustrating a configuration of a drive transmission device and backlash gathering according to a third embodiment.

FIG. 14 illustrates a drive train of a third embodiment. In the third embodiment, a gap is formed in a gear portion on the upstream side rather than forming a gap in the clutch unit. A gear 134 (a first intermediate rotating member) connected to a motor gear 133 (a first rotating member) is held so as to be rotatable about a fixed shaft 137. A gear 135 (a second intermediate rotating member) is held so as to be rotatable about the fixed shaft 137 similarly to the gear 134.

A rotation stopper boss 135b of the gear 135 is inserted in a hole formed in the gear 134. Moreover, a backlash gathering boss 135a of the gear 135 is also inserted in the hole of the gear 134, and a compression spring 136 that applies a second biasing power is stretched. Due to the backlash gathering, a gap D is formed between the boss 135b and the gear 134. This gap D is set to be formed on a side away from an engagement portion.

The rotational driving power of the gear 135 is transmitted to a gear 138 (a third intermediate rotating member), a clutch shaft 144, and a driving-side engagement member 139. When the clutch lever 138 rotates, a release member 143 and a driven-side engagement member 140 are operated by a compression spring 141 and the driven-side engagement member 140 engages with the driving-side engagement member 139. When the driven-side engagement member 140 rotates, rotation is transmitted to the gear 145 (a second rotating member).

As described above, the clutch of the third embodiment is configured so that the driven-side engagement member 140 moves toward the driving-side engagement member 139 unlike the first and second embodiments. The relation of power and the size of the gap for implementing the present embodiment are similar to those of the first and second embodiments, and the redundant description thereof will be omitted. A main feature of the third embodiment is that a gap is formed in a drive train other than the clutch unit. The gap may be formed in a position other than the clutch unit when it is difficult to form the gap in the clutch unit due to limitations in design.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-36060, filed on Feb. 26, 2016, which is hereby incorporated by reference herein in its entirety.

What is claimed is:

1. A drive transmission device comprising:
 a first rotating member that rotates with driving power received from a driving source;
 a second rotating member that rotates with driving power from the first rotating member;
 a driving-side engagement member for transmitting the driving power of the first rotating member to the second rotating member, the driving-side engagement member being provided with a power receiving portion for receiving the driving power of the first rotating member, the power receiving portion engaging with a power applying portion formed in the first rotating member;
 a driven-side engagement member for transmitting the driving power of the first rotating member to the second rotating member; and
 a biasing member that is configured to (i) bias the driving-side engagement member with a first biasing power in a direction which corresponds to a central line of rotation of the first rotating member and in which the driving-side engagement member and the driven-side engagement member engage with each other, and (ii) bias the driving-side engagement member with a second biasing power in a rotating direction of the first rotating member,
 wherein the driving-side engagement member and the driven-side engagement member engage with each other in a state in which the first rotating member is rotating, such that the driving power is transmitted from the first rotating member to the second rotating member via the power applying portion and the power receiving portion,
 wherein a gap is formed between the power applying portion and the power receiving portion in relation to the rotating direction of the first rotating member,
 wherein the driving-side engagement member is biased with the second biasing power which is the biasing power in the rotating direction of the first rotating member,
 wherein the power applying portion and the power receiving portion are separated in the rotating direction by the second biasing power when the driving-side engagement member and the driven-side engagement member are not in engagement, and
 wherein the driving-side engagement member and the driven-side engagement member engage with each other in a state in which the first rotating member is rotating, such that the power applying portion and the power receiving portion engage with each other while resisting against the second biasing power.

2. The drive transmission device according to claim 1, wherein the first rotating member has a depressed portion, the power applying portion is a portion of the depressed portion, the driving-side engagement member has a protruding portion, and the power receiving portion is a portion of the protruding portion.

3. The drive transmission device according to claim 2, wherein the biasing member is a compression torsion spring of which one end is fixed to the first rotating member and the other end is fixed to the driving-side engagement member.

4. The drive transmission device according to claim 3, wherein the compression torsion spring has a protruding portion which protrudes in a direction towards the driving-side engagement member.

5. The drive transmission device according to claim 4, wherein the driving-side engagement member has a hole into which the protruding portion is inserted and engaged.

6. The drive transmission device according to claim 3, wherein the compression torsion spring has a protruding portion which protrudes in a winding diameter of the compression torsion spring.

7. The drive transmission device according to claim 1, further comprising:
 a clutch lever that switches between engagement and disengagement of the driving-side engagement member and the driven-side engagement member.

8. An image forming apparatus for forming an image on a recording material, said apparatus comprising:
 a rotatable member configured to form an image on a recording material; and the drive transmission device according to claim 1 for driving the rotatable member.

9. A drive transmission device comprising:
 a first rotating member that rotates in a first rotating direction with driving power received from a driving source, the first rotating member being provided with a power applying portion;
 a driving-side engagement member being provided with a power receiving portion which engages with the power applying portion to transmit the driving power of the first rotating member in the first rotating direction;
 a driven-side engagement member that is configured to engage with the driving-side engagement member;
 a second rotating member that rotates with the driven-side engagement member; and a biasing member that is configured to (i) bias the driving-side engagement member in an axial direction of the first rotating member so as to engage with the driving-side engagement member and the driven-side engagement member, and (ii) prevent engagement of the power applying portion and the power receiving portion in a state in which the first rotating member is not rotating, wherein the biasing member is torsionally deformed in the first rotating direction by the rotation of the first rotating member, and the power applying portion engages with the power receiving portion in a state in which the biasing member that is torsionally deformed.

10. The drive transmission device according to claim 9, wherein the first rotating member has a depressed portion, the power applying portion is a portion of the depressed portion, the driving-side engagement member has a protruding portion, and the power receiving portion is a portion of the protruding portion.

11. The drive transmission device according to claim 9, wherein the biasing member is a compression torsion spring of which one end is fixed to the first rotating member and the other end is fixed to the driving-side engagement member.

12. The drive transmission device according to claim 11, wherein the compression torsion spring has a protruding portion which protrudes in a direction toward the driving-side engagement member.

13. The drive transmission device according to claim 12, wherein the driving-side engagement member has a hole into which the protruding portion is inserted and engaged.

14. The drive transmission device according to claim 11, wherein the compression torsion spring has a protruding portion which protrudes in a winding diameter of the compression torsion spring.

15. The drive transmission device according to claim 9, further comprising a clutch lever that switches between engagement and disengagement of the driving-side engagement member and the driven-side engagement member.

16. An image forming apparatus for forming an image on a recording material, said apparatus comprising:
- a rotatable member configured to form an image on a recording material; and
- the drive transmission device according to claim 9 for driving the rotatable member.

* * * * *